US011639113B2

(12) United States Patent
Gaither

(10) Patent No.: US 11,639,113 B2
(45) Date of Patent: May 2, 2023

(54) SYSTEMS AND METHODS FOR REDUCING VEHICLE SPEED TO INCREASE SOLAR ENERGY COLLECTION UNDER HIGH SOLAR LOAD EXPOSURE

(71) Applicant: Toyota Motor Engineering & Manufacturing North America, Inc., Plano, TX (US)

(72) Inventor: Geoffrey D. Gaither, Brighton, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 224 days.

(21) Appl. No.: 16/953,219

(22) Filed: Nov. 19, 2020

(65) Prior Publication Data

US 2022/0153143 A1  May 19, 2022

(51) Int. Cl.
*B60K 16/00* (2020.01)
*B60L 15/10* (2006.01)
*B60L 15/20* (2006.01)
*B60L 8/00* (2006.01)

(52) U.S. Cl.
CPC .............. *B60L 15/20* (2013.01); *B60L 8/003* (2013.01); *B60L 2240/12* (2013.01); *B60L 2240/622* (2013.01); *B60L 2240/645* (2013.01); *B60L 2240/665* (2013.01)

(58) Field of Classification Search
None
See application file for complete search history.

(56) References Cited

U.S. PATENT DOCUMENTS

| | | | |
|---|---|---|---|
| 4,627,418 A | 12/1986 | Gibson et al. | |
| 5,680,907 A | 10/1997 | Weihe | |
| 7,338,335 B1 | 3/2008 | Messano | |
| 7,779,943 B2 | 8/2010 | Seidel et al. | |
| 8,612,075 B2 | 12/2013 | Atluri et al. | |
| 8,851,560 B1* | 10/2014 | Freeman | B60J 11/04 180/2.2 |

(Continued)

OTHER PUBLICATIONS

Chen et al. "A Green Time-Bounded Routing Protocol in Solar Based Vehicular Networks" (Year: 2013).*

(Continued)

*Primary Examiner* — Adam D Tissot
(74) *Attorney, Agent, or Firm* — Snell & Wilmer LLP

(57) ABSTRACT

Systems and methods for reducing a current speed of a vehicle that can operate on solar energy to increase solar energy collection. The system may include a photovoltaic (PV) panel configured to receive sunlight to drive an electric motor, a solar loading sensor configured to detect solar load, a global position system (GPS) sensor configured to detect vehicle location data, a speed sensor configured to detect vehicle speed, and an electronic control unit (ECU) connected to the electric motor, the solar loading sensor, the speed sensor, and the GPS sensor. The ECU may determine whether the vehicle is exposed to solar load greater than a predetermined threshold value and, if so, present a driver of the vehicle a minimum acceptable speed to select based on sensor data and a difference of solar energy collection between the minimum acceptable speed and the current speed.

20 Claims, 4 Drawing Sheets

(56) References Cited

U.S. PATENT DOCUMENTS

| | | |
|---|---|---|
| 2007/0023078 A1 | 2/2007 | Palladino |
| 2009/0288890 A1 | 11/2009 | Freeman |
| 2013/0049674 A1 | 2/2013 | Davis |
| 2018/0126851 A1* | 5/2018 | Koebler .................... B60T 1/10 |
| 2018/0361877 A1 | 12/2018 | Ming |
| 2019/0248243 A1* | 8/2019 | Gaither .................. B60L 8/003 |

OTHER PUBLICATIONS

Aqeel et al. "An optimized time bounded routing on solar based vehicular ad-hoc networks using particle swarm optimization".
Chen et al. "A Green Time-Bounded Routing Protocol in Solar Based Vehicular Networks".
Moore "High Tech Tools To Aid Solar Car Team In Race Across Australia".
Daniel et al. "The Optimal Use of the Solar Powered Automobile".
Wu et al. "A management strategy for solar panel—battery—super capacitor hybrid energy system in solar car".

\* cited by examiner

SYSTEMS AND METHODS FOR REDUCING VEHICLE SPEED TO INCREASE SOLAR ENERGY COLLECTION UNDER HIGH SOLAR LOAD EXPOSURE

BACKGROUND

1. Field

The present disclosure is directed to systems and methods for reducing a speed of a vehicle having the ability to utilize solar energy as a source of energy to increase collection of solar energy when the vehicle is exposed to substantial solar load.

2. Description of the Related Art

Fuel efficient vehicles having an electric motor (e.g., hybrid, plug-in hybrid, electric, fuel cell) continue to gain popularity over the years. Recently, the addition of photovoltaic (PV) equipment on such vehicles to harvest solar energy to create electricity and drive their electric motors has become more widespread. Current designs and operation controls for vehicles having PV systems are mainly directed to harvesting solar energy while the vehicles are parked. As fuel efficient vehicles become more popular and technology continues to advance in the field, increasing the solar energy exposure and harvesting efficiency may be critical to the general vehicle efficiency.

As such, there is a need for systems and methods for increasing solar energy collection when a vehicle is exposed to a substantial or high solar load.

SUMMARY

Systems and methods for reducing a speed of a vehicle that can operate on solar energy to increase solar energy collection when the vehicle is exposed to a substantial solar load. A system may include a PV panel that can receive sunlight and convert the sunlight to electricity to drive an electric motor of the vehicle. The system may further include a solar loading sensor that can detect the solar load in real-time. The system may further include a global position system (GPS) sensor that can detect location data based on a location of the vehicle. The system may further include a speed sensor configured to detect a vehicle speed. The system may further include an electronic control unit (ECU) connected to the electric motor, the speed sensor, the solar loading sensor, and the GPS sensor. The ECU may determine if the vehicle is exposed to substantial solar load and, if so, present a driver of the vehicle a minimum acceptable speed based on sensor data and a difference in the solar energy collection at the minimum acceptable speed relative to that of a current speed on a sensory output device. The display or presentation may enable the driver or the ECU to make an informed decision in reducing the current speed to increase the solar energy collection.

In accordance with an embodiment of the present disclosure, there may be a system for reducing a current speed of a vehicle configured to operate on solar energy to increase solar energy collection. The system may have a PV panel. The PV panel may be configured to receive sunlight and convert the sunlight into electricity. The system may have an electric motor. The electric motor may be configured to convert the electricity into mechanical energy to propel the vehicle. The system may have a speed sensor. The speed sensor may be configured to detect a vehicle speed in real-time. The system may have a solar loading sensor. The solar loading sensor may be configured to detect a solar load in real-time. The system may have a GPS sensor. The GPS sensor may be configured to detect location data corresponding to a location of the vehicle in real-time. The system may have an ECU. The ECU may be coupled to the solar loading sensor, the electric motor, the speed sensor, and the GPS sensor. The system may have a radar coupled to the ECU. The radar may be configured to detect speeds of nearby moving vehicles sharing a road with the vehicle. The system may have a memory coupled to the ECU. The memory may store a look-up table having a different driving speed for a given road type.

The ECU may be configured to determine whether the solar load is greater than a predetermined threshold value. The ECU may be further configured to determine a minimum acceptable speed based on sensor data when the solar load is greater than the predetermined threshold value. The ECU may be further configured to calculate a difference between the solar energy collection at the minimum acceptable speed and the current speed. The ECU may be further configured to present the difference to a driver or an ECU of the vehicle on a sensory output device to enable the driver or the ECU to make an informed decision in reducing the current speed to increase the solar energy collection. The ECU may be further configured to automatically reduce the current speed to the minimum acceptable speed when the solar load is greater than the predetermined threshold value. The ECU may account for hysteresis in determining whether the solar load is greater than the predetermined threshold value and continue to operate to reduce the current speed if the solar load falls below the predetermined threshold value within a predetermined range for a predetermined time period. The predetermined threshold value may be determined based on a total solar load potential and an efficiency of the PV panel.

The minimum acceptable speed may be determined by reducing the current speed by a predetermined percentage. The minimum acceptable speed may be determined by reducing the current speed by a predetermined speed. The minimum acceptable speed may be a slowest of the detected speeds of the nearby moving vehicles on the road. The minimum acceptable speed may be determined by using the location data to determine the road type the vehicle is being driven on and the look-up table to determine the driving speed correlating to the determined road type. The minimum acceptable speed may be determined by using the location data to determine a minimum speed limit on a road the vehicle is being driven on.

The ECU may be further configured to determine a new location accessible by the vehicle other than the location of the vehicle. The solar load may be greater than the predetermined threshold value at the new location and greater than the solar load at the location of the vehicle. The ECU may be further configured to determine a maximum acceptable speed based on the sensor data. The ECU may be further configured to present the maximum acceptable speed to the driver to enable the driver to temporarily increase the current speed to the maximum acceptable speed until the vehicle reaches the new location. The ECU may be further configured to automatically increase the current speed to the maximum acceptable speed until the vehicle reaches the new location.

In accordance with an embodiment of the present disclosure, there may be a method for reducing a current speed of a vehicle configured to operate on solar energy to increase solar energy collection. The method may include receiving, by an ECU, an input from a driver of the vehicle that the driver desires to reduce the current speed to increase the solar energy collection. The method may further include detecting a solar load via a solar loading sensor coupled to the ECU. The method may further include determining that the solar load is greater than a predetermined threshold value via the ECU. The method may further include determining, by the ECU, whether a road the vehicle is being driven on has a minimum speed limit via location data obtained from a GPS sensor connected to the ECU. The method may further include calculating, by the ECU, a difference between the solar energy collection of the vehicle at the current speed and at the minimum speed limit if the minimum speed limited is detected. Alternately, the method may further include calculating a difference between the solar energy collection of the vehicle at the current speed and at one or more optimized speeds if no minimum speed limit is detected. The one or more optimized speeds may be determined based on data detected by one or more sensors including the GPS sensor. The method may further include presenting, by a sensory output device, the difference to a driver of the vehicle to enable the driver to make an informed decision in reducing the current speed to the minimum speed limit or the one or more optimized speeds.

The method may further include automatically reducing, by the ECU, the current speed to the minimum speed limit if the minimum speed limit is detected. Alternately, the method may further include automatically reducing, by the ECU, the current speed to one of the one or more optimized speeds determined to result in the highest solar energy collection if no minimum speed limit is detected when the solar load is greater than the predetermined threshold value.

One of the one or more optimized speeds may be determined by reducing the current speed by a predetermined percentage. One of the one or more optimized speeds may be determined by reducing the current speed by a predetermined speed. The method may further include detecting speeds of nearby moving vehicles sharing the road with the vehicle via a radar coupled to the ECU. One of the one or more optimized speeds may be determined by a slowest of the detected speeds of the nearby moving vehicles on the road. A memory coupled to the ECU may store a look-up table having a different driving speed for a given road type. One of the one or more optimized speeds may be determined by using the location data to determine the road type the vehicle is being driven on and the look-up table to determine the driving speed correlating to the determined road type.

The ECU may account for hysteresis in determining whether the solar load is greater than the predetermined threshold value and continue to operate to reduce the current speed if the solar load falls below the predetermined threshold value within a predetermined range for a predetermined time period. The predetermined threshold value may be determined based on a total solar load potential and an efficiency of the PV panel.

In accordance with an embodiment of the present disclosure, there may be a method for reducing a current speed of an autonomous or semi-autonomous vehicle configured to operate on solar energy to increase solar energy collection. The method may include detecting a solar load via a solar loading sensor coupled to an ECU. The method may further include determining that the solar load is greater than a predetermined threshold value via the ECU. The method may further include determining, by the ECU, whether a road the vehicle is being driven on has a minimum speed limit via location data gathered obtained from a GPS sensor connected to the ECU. The method may further include determining, by the ECU, a minimum acceptable speed based on the determined minimum speed limit or the other sensor data detected by one or more sensors including the GPS sensor if there no minimum speed limit. The method may further include automatically reducing, by the ECU, the current speed to the minimum acceptable speed. The method may further include periodically checking, by the ECU, whether the minimum acceptable speed has changed based on one or more new conditions of the road and, if so, determining a new minimum acceptable speed and automatically setting the current speed to the new minimum acceptable speed. The method may further include determining, by the ECU, a difference between the solar energy collection of the vehicle at the current speed and at the minimum acceptable speed and informing, by a sensory output device, the driver of the difference to enable the driver to make an informed decision in reducing the current speed to increase the solar energy collection.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

The systems and methods described herein reduce a current speed of a vehicle that can operate on solar energy to increase or maximize solar energy collection when the vehicle is exposed to a substantial or high solar load. The current speed of the vehicle may be reduced to a minimum acceptable speed. For example, the minimum acceptable speed may be determined by reducing the current speed of the vehicle to a minimum road speed limit, a predetermined percentage, or a predetermined speed value. Other examples include determining the slowest vehicle on the road via a radar or using a look-up table stored in a memory or an electronic control unit (ECU) that has a different driving speed for a given road type. In autonomous and semi-autonomous vehicles, the ECU may advantageously and automatically reduce the current speed to the minimum acceptable speed when the solar load is substantial. The term "driver" may be interchanged with "passenger" when referring to autonomous or semi-autonomous vehicles.

An exemplary system may include a photovoltaic (PV) panel that can receive sunlight and convert the sunlight into electricity. The system may further include an electric motor that can convert the electricity into mechanical energy to propel the vehicle. The system may further include one or more sensors. One of the sensors may be a speed sensor that can detect vehicle speed in real-time. Another one of the sensors may be a solar loading sensor that can detect the solar load. Another one of the sensors may be a global positioning system (GPS) sensor that can detect a location of the vehicle and data pertaining to the location (e.g., minimum speed limit, maximum speed limit, terrain type, etc.). The system may further include an electronic control unit (ECU) coupled to the electric motor and the sensors. The ECU may determine if the vehicle is exposed to substantial solar load, and if so, advantageously present, on a sensory output device, a driver of the vehicle a minimum acceptable speed based on data gathered from the sensors and a difference in the solar energy collection at the minimum acceptable speed versus the solar energy collection at the current speed. The minimum acceptable speed may be determined through a variety of means. The presentation of the minimum acceptable speed and the difference in the solar energy collection between speeds may advantageously enable the driver to make an informed decision in reducing the current speed to increase the solar energy collection. The presentation via a sensory output device may be visual (e.g., on dashboard or infotainment unit) or audible (e.g., voice projected through sound system).

Figure 1:
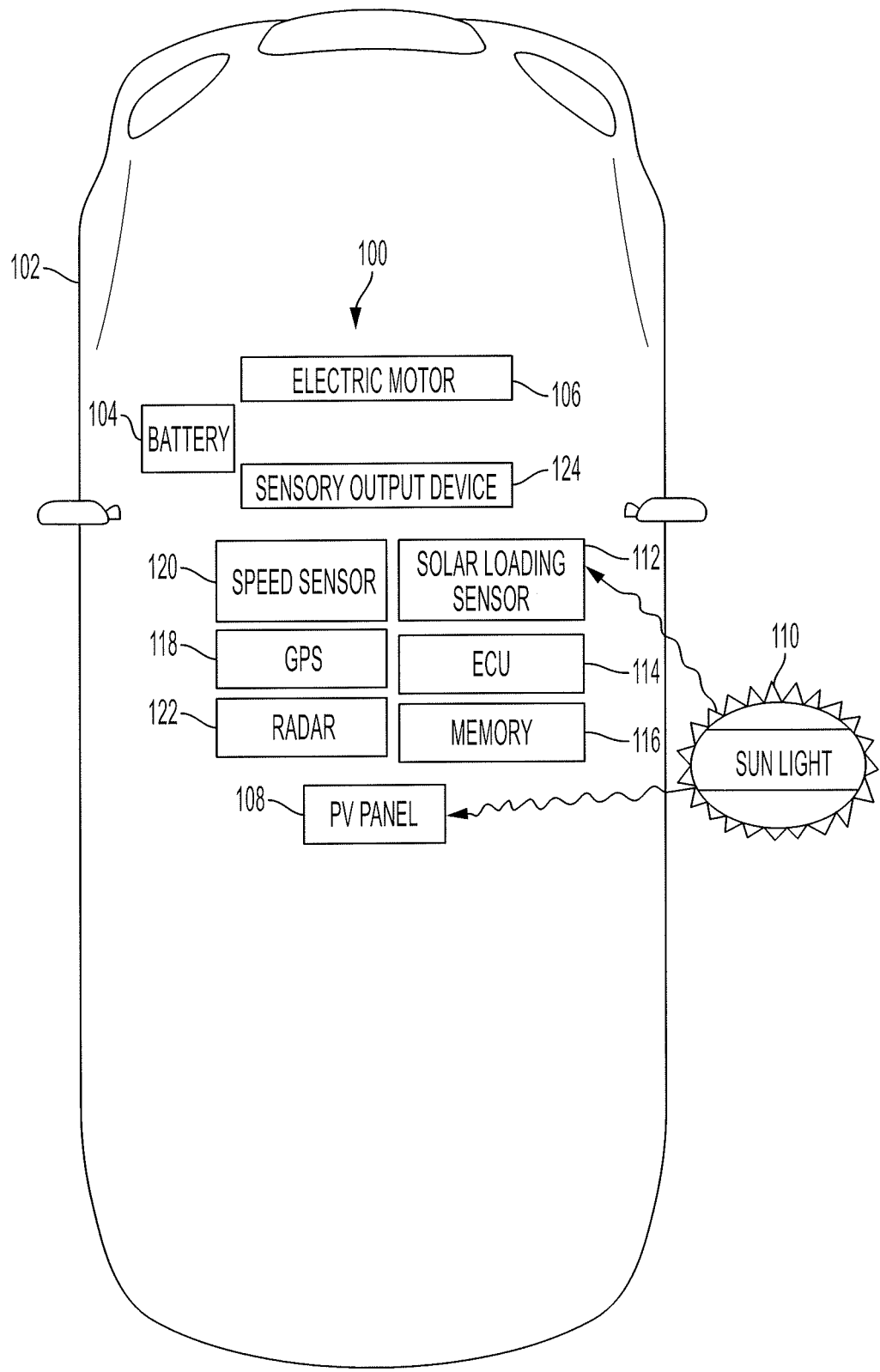
FIG. 1 illustrates a block diagram of a system for reducing a current speed of a vehicle that can operate on solar energy to increase solar energy collection according to an aspect of the present disclosure.

FIG. 1 illustrates a block diagram of a system 100 for reducing a current speed of a vehicle 102 that can operate on solar energy to increase solar energy collection according to an aspect of the present disclosure. The vehicle 102 may be an electric vehicle powered by a battery (or multiple batteries) 104. The vehicle 102 may be a partial electric vehicle, such as a hybrid vehicle or a plug-in hybrid vehicle, which may have an internal combustion engine in addition to an electric motor 106. The vehicle 102 may be a fully electric vehicle which may solely rely on the electric motor 106 to propel the vehicle 102 forward. The vehicle 102 may be a hydrogen fuel-cell vehicle that has a fuel cell in addition to the battery 104 for the electric motor 106 to draw electricity from. The battery 104 may be one or more batteries connected to each other and to the electric motor 106 to power the electric motor 106. The battery 104 may also provide power to other electrical components of the vehicle 102. The battery 104 may be any kind of battery, for example, a lithium-ion battery.

The system 100 may have a PV panel 108. The PV panel 108 is made up of one or more PV cells. The PV cells may be made from various semiconductors, including silicon, which can absorb light. The PV cells harvest solar energy when exposed to sunlight 110 and convert solar energy into electricity. Solar energy frees electrons in the semiconductors, thereby creating a flow of electrons. The flow of electrons generates electricity that powers the battery 104, which then powers the electric motor 106. The electric motor 106 converts electricity into mechanical energy and propels the vehicle 102.

The system 100 may have a solar loading sensor 112. The solar loading sensor 112 may be configured to detect a solar load, an irradiance, or an amount of sunlight 110, in real-time. The solar loading sensor 112 may have a photodiode with a sensitivity to the sunlight 110. Resistance in the solar loading sensor 112 may increase as the solar load increases. The solar load may indicate the sunlight 110 exposure of the PV panel 108. For an accurate measurement, the solar loading sensor 112 may be uncovered such that it is directly exposed to the sunlight 110. Preferably, the solar loading sensor 112 may be placed near the PV panel 108 to have a more accurate measurement of the sunlight 110 exposure of the PV panel 108. The solar load may be quantified in watts per meter squared $$\left(\frac{W}{m^2}\right).$$

The solar loading sensor 112, may be in communication with one or more computers or ECUs 114.

The one or more ECUs 114 may be programmed to control one or more operations of the vehicle 102. The one or more ECUs 114 may be implemented as a single ECU 114 or in multiple ECUs 114. The ECU 114 may be electrically coupled to some or all of the components of the vehicle 102. In some embodiments, the ECU 114 is a central ECU configured to control one or more operations of the entire vehicle 102. In some embodiments, the ECU 114 is multiple ECUs located within the vehicle 102 and each configured to control one or more local operations of the vehicle 102. In some embodiments, the ECU 114 is one or more computer processors or controllers configured to execute instructions stored in a non-transitory memory 116. The memory 116 may store machine-readable instructions usable by the ECU 114 and may store other data as requested by the ECU 114.

The ECU 114 may receive solar load data from the solar loading sensor 112 and determine whether the solar load is greater than a predetermined threshold value. A solar load greater than the predetermined threshold value may indicate that the solar load is substantial or high enough to effectively harvest solar energy. The predetermined threshold value may be determined based on a total solar load potential and an efficiency of the PV panel 108.

The total solar load potential may be based on the amount of insolation. Insolation is a measure of sunlight 110 that is incident on a specified area (i.e., solar panel) over a set period of time. Insolation may be quantified in watts per meter squared $$\left(\frac{W}{m^2}\right).$$

Insolation is dependent on the location of the PV panel 108, and thus the location of the vehicle 102. As such, the total solar load potential of the PV panel 108 may be determined from location data gathered by a location sensor, or a global positioning system (GPS) sensor 118. Insolation data for a given location may be stored in the memory 116 or obtained via a network access device capable of communicating with the cloud. Insolation data, which may be an approximation, may be generated year-round via satellite and modeling by third-party entities such as the National Aeronautics and Space Administration (NASA) and made publicly available. In some embodiments, the vehicle 102 may have a solar insolation sensor that measures an actual insolation received over a period of time.

The efficiency of the PV panel 108 is based on the amount of sunlight 110 that is converted into electricity. The PV panels 108 that convert twenty percent (20%) or greater of the solar load into electricity may be high efficiency panels.

The PV panels 108 that convert between approximately sixteen percent (16%) and nineteen percent (19%) may be low efficiency panels.

The predetermined threshold value may be stored in the memory 116. The predetermined threshold value may be recalculated by the ECU 114 based on the change in the total solar load potential. By example and not limitation, in high efficiency PV panels, the predetermined threshold value may be set to fifty percent (50%) of the total solar load potential. In low efficiency PV panels 108, the predetermined threshold value may be set to greater than fifty percent (50%) of the total solar load potential. For example, the predetermined threshold value may be set to seventy percent (70%) of the total solar load potential. Setting the predetermined threshold value to greater than fifty percent (50%) of the total solar load potential in low efficiency PV panels 108 may be desirable; having to reduce the speed of the vehicle 102 when the solar load is relatively low while the PV panel 108 is operating on relatively low efficiency may not be efficient for the vehicle 102.

When the ECU 114 determines whether the solar load is greater than the predetermined threshold value, the ECU 114 may account for hysteresis. Hysteresis is a phenomenon where the value of a physical property lags behind changes in the effect causing it. In accounting for hysteresis, the ECU 114 may process a drop in the solar load due to a delay that causes the solar load to fall below the predetermined threshold value as greater than the predetermined threshold value. Hence, the predetermined threshold value may have a tolerance defined by a predetermined range and a predetermined time period that accounts for hysteresis. The predetermined range of drop in the solar load due to the delay may be between one tenth percent (0.1%) and five percent (5%), preferably between one tenth percent (0.1%) and three percent (3%), and most preferably between one tenth percent (0.1%) and two percent (2%). The predetermine time period that reflects the delay may be between one millisecond and one minute, preferably between one millisecond and thirty seconds, and most preferably between one millisecond and five seconds.

After the ECU 114 determines that the solar load is greater than the predetermined threshold value, the ECU 114 may determine a minimum acceptable speed based on sensor data. The sensor data may be received from the solar loading sensor 112, the GPS sensor 118, a speed sensor 120, and/or a radar 122, all of which may be coupled to the ECU 114. In some embodiments, the minimum acceptable speed may be the legal minimum speed limit on the road determined by the location data gathered via the GPS sensor 118. Often, a road the vehicle 102 is being driven on may not have a designated legal minimum speed limit. When this is the case, the minimum acceptable speed may be determined in a variety of ways or methods. In some embodiments, the minimum acceptable speed may be determined by measuring the current speed with the speed sensor 120 and reducing the current speed by a predetermined percentage via the ECU 114. For example, the current speed may be reduced by between five percent (5%) and fifteen percent (15%). In some embodiments, the minimum acceptable speed may be determined by measuring the current speed with the speed sensor 120 and reducing the current speed by a predetermined speed value. For example, the current speed may be reduced by five (5) to twenty-five (25) miles per hour.

The radar 122 may be configured to detect speeds of nearby moving vehicles sharing the road with the vehicle 102. In some embodiments, the minimum acceptable speed may be the slowest of the detected speeds of the nearby moving vehicles on the road. In some embodiments, the minimum acceptable speed may be an average of the detected speeds of the nearby moving vehicles on the road. In some embodiments, the minimum acceptable speed may be an average of a predetermined number of slowest detected speeds of the nearby moving vehicles on the road.

The memory 116 may store a look-up table having a different driving speed for a given road type. The look-up table may also be accessible via a network access device capable of communicating with the cloud. The look-up table may have, for instance, lower speeds designated for an unpaved road or a downhill road relative to speeds designated for a freeway or an expressway. The minimum acceptable speed may be determined by using the location data from the GPS sensor 118 to determine the road type the vehicle 102 is being driven on and the look-up table to determine the driving speed correlating to the determined road type.

Once the ECU 114 determines the minimum acceptable speed, the ECU 114 may calculate a difference between the solar energy collection at the minimum acceptable speed and the current vehicle speed. In some embodiments, the difference may be an instantaneous difference in the solar load collection. In some embodiments, the difference may be a projected solar load over a given period of time or a given distance. For example, if the minimum acceptable speed is forty-five (45) miles per hour and the current speed is seventy (70) miles per hour, more solar load may be collected over thirty (30) minutes or ten (10) miles, given that everything else is held constant. In some embodiments, the driver may input a destination into the GPS sensor 118, and the ECU 114 may present the driver with the difference between the solar energy collection at the minimum acceptable speed and the current speed over a trip to the destination. The ECU 114 may account for any route related changes to the minimum acceptable speed, the solar load, and the total solar load potential based on estimation using the location data gathered from the GPS sensor 118 and/or look-up tables stored in the memory 116 or in the cloud.

Once the ECU 114 calculates the difference between the solar energy collection at the minimum acceptable speed and the current speed, the ECU 114 may present the difference to the diver or operator of the vehicle 102. The presentation medium may be a sensory output device 124. In some embodiments, the sensory output device 124 may be an analog or digital display. For example, the sensory output device 124 may be a gauge or dial on the dashboard or an infotainment unit. The difference in the solar energy collection may be represented visually by displaying a numeric value, written or in Arabic numerals, or by moving a dial to point at a numeric value or bar that represents a numeric value. In some embodiments, the sensory output device 124 may be a sound system. For example, the presentation may be in the form of a voice assistant reciting the difference in the solar energy collection through one or more speakers of the sound system. Upon being presented the difference in the solar energy collection, the driver may decide whether to reduce the current speed to the minimum acceptable speed.

In some embodiments, the ECU 114 may present a difference between the solar energy collection at one or more optimized speeds and the current speed. The one or more optimized speeds may be between the minimum acceptable speed and the current speed. The one or more optimized speeds may be desirable by the driver if the driver is not willing to go as slow as the minimum acceptable speed but still wishes to increase the solar energy collection. For example, the ECU 114 may present the driver with the difference between the solar energy collection at a minimum acceptable speed of forty-five (45) miles per hour, an optimized speed of fifty-five (55) miles per hour, and a current speed of seventy (70) miles per hour. The one or more optimized speeds may be determined by one or more of the various previously discussed methods to determine minimum acceptable speed when there is no legal minimum speed limit on the road. The methods that result in a speed or speeds greater than the minimum acceptable speed may be selected by the ECU 114 as the one or more optimized speeds.

If the vehicle 102 is autonomous or semi-autonomous, the ECU 114 may automatically reduce the current speed to the minimum acceptable speed when the solar load is greater than the predetermined threshold value. The ECU 114 may communicate with (e.g., reduce power to) the electric motor 106 and/or apply the brakes of the vehicle 102 to reduce the speed of the vehicle 102. In some embodiments, the ECU 114 may also present the difference between the solar energy collection at the minimum acceptable speed and the current speed to the driver or the passenger because the vehicle may be in autonomous driving mode. The presentation may be prior to, simultaneous, or after the automatic speed reduction. In some embodiments, the ECU 114 may present the minimum acceptable speed and prompt the driver or the passenger to input a selection to reduce the current speed to the minimum acceptable speed. The input may be touch of a button, a touch screen, or voice command. Activating or pressing a brake pedal may not be necessary to reduce the current speed. In some embodiments, the ECU 114 may present the minimum acceptable speed and/or the one or more optimized speeds for the driver or the passenger to make the selection. Following the selection, the ECU 114 may automatically reduce the current speed to the selected speed.

Figure 2:
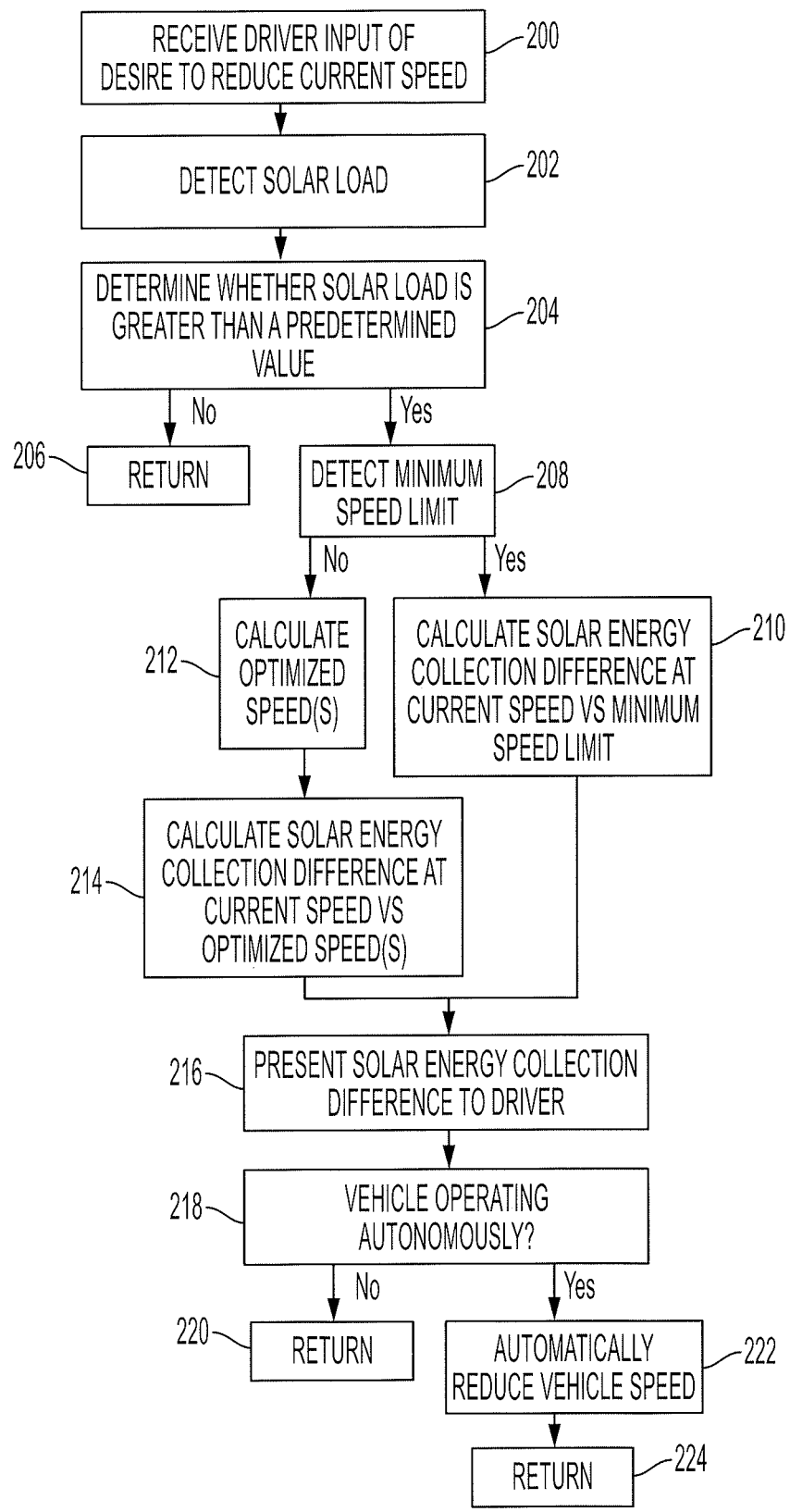
FIG. 2 illustrates a flow chart of a method for reducing a current speed of a vehicle configured to operate on solar energy to increase solar energy collection according to an aspect of the present disclosure.

FIG. 2 illustrates a flow chart of a method for reducing a current speed of the vehicle 102 that is configured to operate on solar energy to increase solar energy collection according to an aspect of the present disclosure. The method may be performed with the system 100 of FIG. 1. In block 200, the method may begin with the ECU 114 receiving input from the driver of a desire to reduce the current speed of the vehicle 102 to increase the solar energy collection. The input may be in response to a prompt presented by the system 100. In some embodiments, a visual prompt may appear on the dashboard or the infotainment unit. In some embodiments, an auditory prompt may be projected through the sound system. The input may be received by pressing a virtual button on a touch display or a physical button. The input may also be a voice command received through a microphone. The input may be prompted and received while starting the vehicle 102, setting a travel destination via the GPS sensor 118, driving the vehicle 102, or when the vehicle 102 is stationary. Following the ECU 114 receiving affirmation of the desire to reduce the current speed, the method may continue with block 202.

In block 202, the solar loading sensor 112 may detect the solar load on the PV panel 108 in real-time. The solar load may indicate the sunlight 110 exposure of the PV panel 108. The solar load may decrease when, for example, driving under an overcast sky, in a closed parking garage, or in a tunnel. The solar load may be highest when driving under a clear sky during a solar noon. For an accurate measurement, the solar loading sensor 112 may be uncovered such that it is directly exposed to the sunlight 110. Preferably, the solar loading sensor 112 may be placed near the PV panel 108 to have a more accurate measurement of the sunlight 110 exposure of the PV panel 108. The solar load may be quantified in watts per meter squared $$\left(\frac{W}{m^2}\right).$$

The solar loading sensor 112 may be in communication with the ECU 114. Once the solar loading sensor 112 detects the solar load, the memory 116 may store the solar load data.

In block 204, the ECU 114 may determine whether the solar load is greater than a predetermined threshold value. If the solar load is not greater than the predetermined threshold value, the method may return in block 206. In some embodiments, if the solar load is not greater than but equal to the predetermined threshold value, the method may still continue to detect a minimum speed limit in block 208. The system 100 may account for hysteresis and provide a tolerance for a lower than predetermined threshold value load when the solar load is within a predetermined range for a predetermined time due to delay. In such instances, the method may still continue to block 208. A solar load greater than the predetermined threshold value may indicate that the solar load is substantial or high enough to effectively harvest solar energy. The predetermined threshold value may be determined based on the total solar load potential and the efficiency of the PV panel 108. The predetermined threshold value may be stored in the memory 116. The predetermined threshold value may be recalculated by the ECU 114 based on changes to the total solar load potential. When the ECU 114 determines that the solar load is greater than the predetermined threshold value, the method continues with block 208.

In block 208, the GPS sensor 118 detects the minimum speed limit of the road the vehicle 102 is being driven on. The minimum speed limit is the legal speed assigned to the road that one cannot drive below in a motor vehicle. The minimum speed limit may change based on the vehicle class. For example, a class B vehicle (e.g., a commercial truck) may have a lower minimum speed limit than a class C vehicle (e.g., a sedan). The memory 116 may store the vehicle class information and the ECU 114 may access this information to interpret the location data it receives from the GPS sensor 118 to determine the correct minimum speed limit for the vehicle 102. When the GPS sensor 118 detects a minimum speed limit, the method may continue to block 210 to calculate the solar energy collection difference between the current speed and the minimum speed limit. Often, the GPS sensor 118 may not detect a minimum speed limit because the road may not have one officially assigned by law or authorities. When this is the case, the method may continue with block 212 to calculate one or more optimized speeds.

In block 210, the ECU 114 may calculate the difference between the solar energy collection at the minimum speed limit and the current speed. In some embodiments, the difference may be an instantaneous difference in the solar load collection. In some embodiments, the difference may be a projected solar load over a given period of time or a given distance. In some embodiments, the driver may input a destination into the GPS sensor 118, and the ECU 114 may present the driver with the difference between the solar energy collection at the minimum acceptable speed and the current speed over a trip to the destination. The ECU 114 may account for any route related changes to the minimum acceptable speed, the solar load, and the total solar load potential based on estimation using the location data gathered from the GPS sensor 118 and/or look-up tables stored in the memory 116 or in the cloud.

If the system 100 does not detect a minimum speed limit for the road the vehicle 102 is being driven on via the location data, the ECU 114 may calculate one or more optimized speeds in block 212. The one or more optimized speeds may be determined by measuring the current speed with the speed sensor 120 and reducing the current speed by a predetermined percentage via the ECU 114. The one or more optimized speeds may be determined by measuring the current speed with the speed sensor 120 and reducing the current speed by a predetermined speed value. The one or more optimized speeds may be the slowest of the detected speeds by the radar 122 of the nearby moving vehicles on the road. The one or more optimized speeds may be an average of the detected speeds of the nearby moving vehicles on the road. The one or more optimized speeds may be an average of a predetermined number of slowest detected speeds of the nearby moving vehicles on the road. In some embodiments, the memory 116 may store a look-up table having a different driving speed for a given road type. The look-up table may also be accessible via a network access device capable of communicating with the cloud. The one or more optimized speeds may be determined by using the location data from the GPS sensor 118 to determine the road type the vehicle 102 is being driven on and the look-up table to determine the driving speed correlating to the determined road type. In some embodiments, one of the aforementioned processes may yield a single optimized speed to compare with the current speed in block 214. In some embodiments, some or all of the aforementioned processes may yield a plurality of optimized speeds to compare with the current speed and between or among each other in block 214.

In block 214, the ECU 114 may calculate the difference between or among the solar energy collection at the current speed and the one or more optimized speeds. In some embodiments, the difference may be an instantaneous difference in the solar load collection. In some embodiments, the difference may be a projected solar load over a given period of time or a given distance. In some embodiments, the driver may input a destination into the GPS sensor 118, and the ECU 114 may present the driver with the difference between the solar energy collection at the one or more optimized speeds and the current speed over a trip to the destination. The ECU 114 may account for any route related changes to the one or more optimized speeds, the solar load, and the total solar load potential based on estimation using the location data gathered from the GPS sensor 118 and/or the look-up tables stored in the memory 116 or in the cloud.

In block 216, the ECU 114 may present the solar energy collection difference to the driver. The presentation medium may be the sensory output device 124. In some embodiments, the sensory output device 124 may be an analog or digital display. The difference in the solar energy collection may be represented visually by displaying a numeric value, written or in Arabic numerals, or by moving a dial to point at a numeric value or a shape that represents a numeric value. In some embodiments, the sensory output device 124 may be a sound system. The presentation may be of the difference in solar energy collection difference at the current speed and at the minimum speed limit. Upon being presented the difference in the solar energy collection, the driver may decide whether to reduce the current speed to the minimum acceptable speed. The presentation may be of the difference in solar energy collection difference at the current speed and at the one or more optimized speeds. Upon being presented the difference in the solar energy collection, the driver or the passenger may decide whether to reduce the current speed to the optimized speed when the ECU 114 only calculates a single optimized speed. In some embodiments, the driver or the passenger may decide whether to reduce the current speed to one of the plurality of optimized speeds when the ECU 114 calculates a plurality of optimized speeds.

In autonomous or semi-autonomous vehicles with self-driving capabilities, the ECU 114 may present the difference in the solar energy collection to the driver or the passenger to inform the driver or the passenger prior to automatically reducing speed to increase solar energy collection. In block 218, the method may diverge based on whether the vehicle 102 is autonomous or semi-autonomous. If the vehicle 102 is not autonomous or semi-autonomous with self-driving capabilities, the method may return in block 220. If the vehicle 102 is autonomous or semi-autonomous, the ECU 114 may automatically reduce the current speed of the vehicle 102 by communicating with the electric motor 106 and the brakes of the vehicle 102 in block 222. Thereafter, the method may return in block 224.

Figure 3:
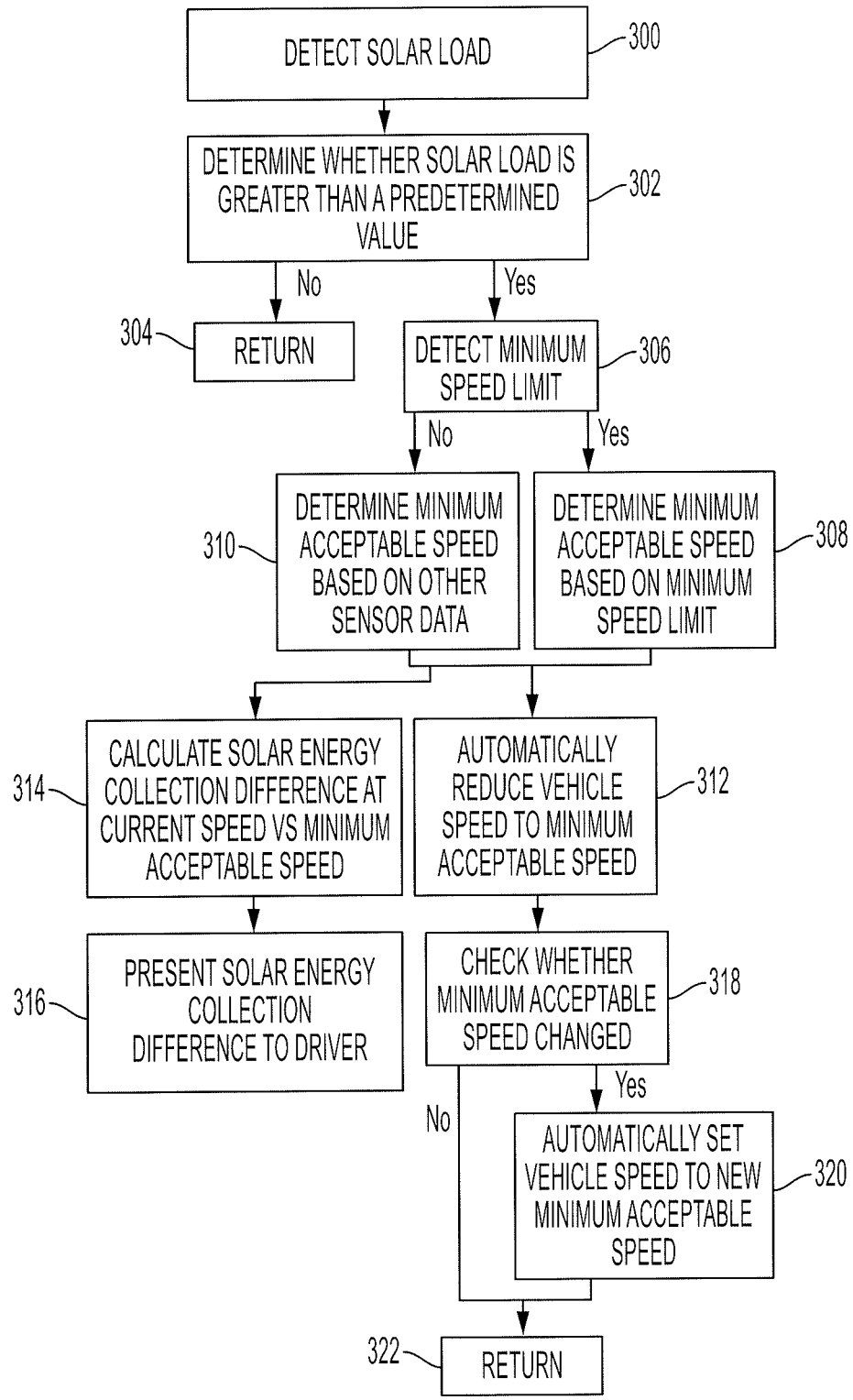
FIG. 3 illustrates a flow chart of a method for reducing a current speed of an autonomous or semi-autonomous vehicle configured to operate on solar energy to increase solar energy collection according to an aspect of the present disclosure.

FIG. 3 illustrates a flow chart of a method for reducing a current speed of an autonomous or semi-autonomous vehicle 102 configured to operate on solar energy to increase solar energy collection according to an aspect of the present disclosure. The method may be performed with the system 100 of FIG. 1. In block 300, the method may begin with the solar loading sensor 112 detecting the solar load on the PV panel 108 in real-time. The solar loading sensor 112 may be in communication with the ECU 114. Once the solar loading sensor 112 detects the solar load, the memory 116 may store the solar load data.

In block 302, the ECU 114 may determine whether the solar load is greater than a predetermined threshold value. If the solar load is not greater than the predetermined threshold value, the method may return in block 304. In some embodiments, if the solar load is not greater than but equal to the predetermined threshold value, the method may still continue to detect a minimum speed limit in block 306. The system 100 may account for hysteresis and provide a tolerance for a lower than the predetermined threshold value load when the solar load is within a predetermined range for a predetermined time due to delay. In such instances, the method may still continue to block 306. The predetermined threshold value may be determined based on the total solar load potential and the efficiency of the PV panel 108. The predetermined threshold value may be stored in the memory 116. The predetermined threshold value may be recalculated by the ECU 114 based on changes to the total solar load potential. When the ECU 114 determines that the solar load is greater than the predetermined threshold value, the method may continue with block 306.

In block 306, the GPS sensor 118 may detect the minimum speed limit of the road the vehicle 102 is being driven on. When the GPS sensor 118 detects a minimum speed limit, the method may continue to block 308 to determine a minimum acceptable speed based on the minimum speed limit.

In block 308, the ECU 114 may set the minimum acceptable speed to the minimum speed limit. When the GPS sensor 118 cannot detect a minimum speed limit, the method may continue to block 310. In block 310, the ECU 114 may determine the minimum acceptable speed based on other sensor data. The minimum acceptable speed may be determined by measuring the current speed with the speed sensor 120 and reducing the current speed by a predetermined percentage via the ECU 114. The minimum acceptable speed may be determined by measuring the current speed with the speed sensor 120 and reducing the current speed by a predetermined speed value. The minimum acceptable speed may be the slowest of the detected speeds by the radar 122 of the nearby moving vehicles on the road. The minimum acceptable speed may be an average of the detected speeds of the nearby moving vehicles on the road. The minimum acceptable speed may be an average of a predetermined number of slowest detected speeds of the nearby moving vehicles on the road. In some embodiments, the memory 116 may store a look-up table having a different driving speed for a given road type. The look-up table may also be accessible via a network access device capable of communicating with the cloud. The minimum acceptable speed may be determined by using the location data from the GPS sensor 118 to determine the road type the vehicle 102 is being driven on and the look-up table to determine the driving speed correlating to the determined road type.

In some embodiments, the ECU 114 may perform one of the aforementioned processes to determine the minimum acceptable speed. In some embodiments, the ECU 114 may perform some or all of the aforementioned processes and choose one of the results as the minimum acceptable speed. The chosen speed may be the slowest of all of the speed results for maximum solar energy collection. The chosen speed may be based on an input received from the driver. For example, the driver may set a preference that the driver desires for the vehicle 102 to drive over a certain speed. In another example, the driver may set a preference that the driver desires a maximum solar energy collection increase, a balanced solar energy collection increase, or a minimum solar energy collection increase. The ECU 114 may set the slowest speed result as the minimum acceptable speed in response to the maximum solar energy collection increase setting. Similarly, the ECU 114 may set the fastest speed result as the minimum acceptable speed in response to the minimum solar energy collection increase setting. The ECU 114 may set an average or a median of the speed results as the minimum acceptable speed in response to the balanced solar energy collection increase. The blocks 308, 310 may continue with blocks 312, 314.

In block 312, the ECU 114 may automatically reduce the current speed of the vehicle 102 to the minimum acceptable speed by communicating with the electric motor 106 and the brakes of the vehicle 102. Additionally, in block 314, the ECU 114 may calculate the difference in solar energy collection between the current speed and the minimum acceptable speed and present the solar energy collection difference to the driver in block 316.

In block 318, the ECU 114 may periodically check whether the minimum acceptable speed has changed. The checking may continue as long as the solar load is greater than the predetermined threshold value. The system 100 may have a timer that counts to a predetermined time before the ECU 114 initiates the checking. The predetermined time may range from one (1) second to one (1) hour. For example, the timer may time one (1) minute and prompt the ECU 114 to initiate the checking, then reset, and restart timing. The system ECU 114 may repeat the minimum acceptable speed calculations for blocks 308, 310 to check whether the minimum acceptable speed has changed. For example, the vehicle 102 may be on a different road that requires a higher minimum speed limit. In another example, the vehicle 102 may switch from a paved road to an off-road terrain and warrant a lower minimum acceptable speed.

If the ECU 114 determines that the minimum acceptable speed has changed, the ECU 114 may automatically set the vehicle 102 speed to the new minimum acceptable speed in block 320. After block 320, or if the ECU 114 determines that the minimum acceptable speed has not changed, the method may return with block 322.

Figure 4:
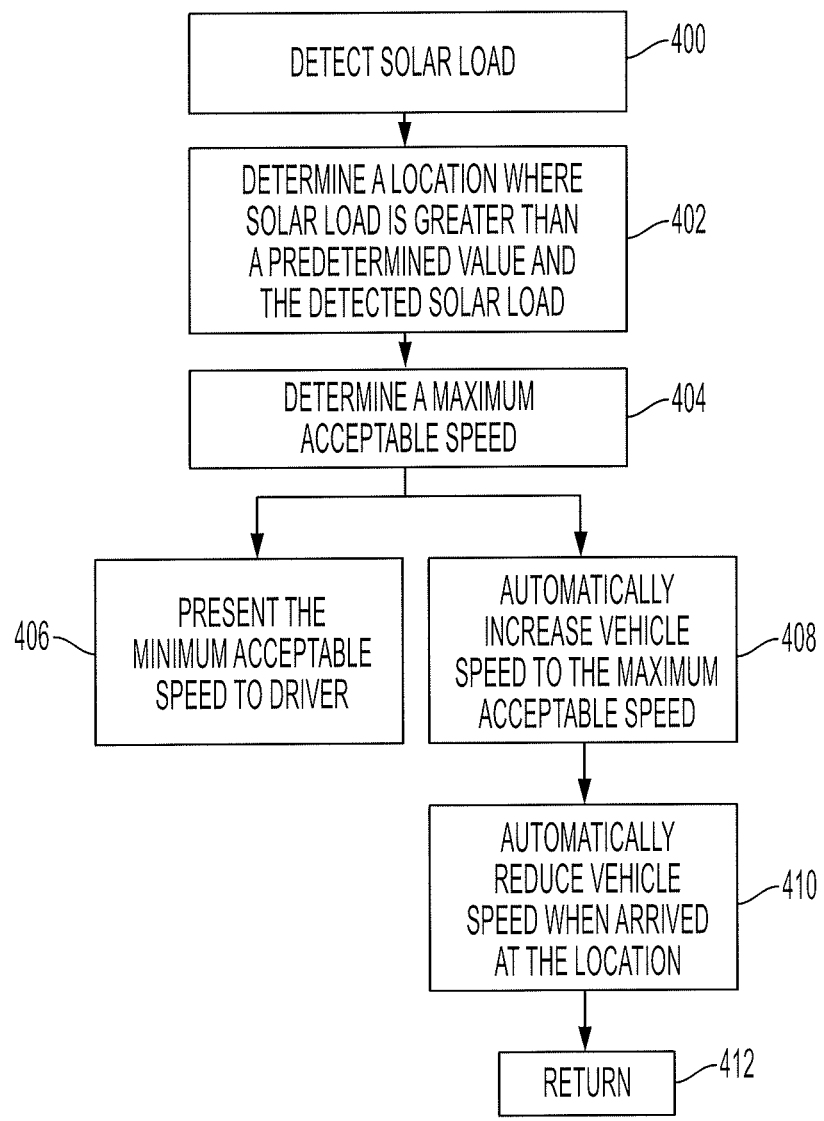
FIG. 4 illustrates a flow chart of a method for temporarily increasing a current speed of an autonomous or semi-autonomous vehicle configured to operate on solar energy to reach a high solar load location quicker according to an aspect of the present disclosure.

FIG. 4 illustrates a flow chart of a method for temporarily increasing a current speed of an autonomous or semi-autonomous vehicle 102 configured to operate on solar energy to reach a high solar load location quicker to increase solar energy collection according to an aspect of the present disclosure. For example, the vehicle 102 may be driving through wooded or mountainous roads where the solar load is generally low, and the method may direct the vehicle 102 to an open road with a high solar load quicker. When the vehicle 102 reaches the high solar load road, the vehicle 102 may reduce the speed via the methods explained in discussing FIGS. 2 and 3. The process may be performed with the system 100 of FIG. 1.

In block 400, the method may begin with the solar loading sensor 112 detecting the solar load on the PV panel 108 in real-time. The solar loading sensor 112 may be in communication with the ECU 114. Once the solar loading sensor 112 detects the solar load, the memory 116 may store the solar load data.

In block 402, the ECU 114 may determine a new location where the solar load is greater than a predetermined value and the solar load detected in block 400. In some embodiments, the method continuing from block 400 to block 402 may be conditioned on the detected solar load being equal to or less than the predetermined value. In some embodiments, the system 100 may perpetually look for a new location where the solar load is greater than the current location of the vehicle 102 irrespective of whether the detected solar load is greater, equal to, or less than the predetermined value. The new location may be detected via the GPS sensor 118, the cloud, a cellular network, or any other method that would be appreciated by one of ordinary skill in the art. For example, the new location may be detected via vehicle to vehicle (V2V) or infrastructure to vehicle (I2V) communication. Other vehicles or stationary PV panels ahead of the vehicle 102 along a route of the vehicle 102 may share their collected solar load data with the vehicle 102. In critical situations where the vehicle 102 is in immediate need of effective solar energy collection and/or based on the driver's decision, the ECU 114 may also consider the solar load data of other vehicles or stationary PV panels situated away from the direction of the route of the vehicle 102. Once the new location is determined, the ECU 114 may mark the new location on the navigation system of the vehicle 102. If the new location is not along the initial route of the vehicle 102, the ECU 114 may generate a new route and reflect the change on the navigation system. In an autonomous and semi-autonomous vehicle 102, the ECU 114 may reroute the vehicle 102 to the new location. The new location may be an inception point marking the beginning of a high solar load road or part of a road from the incoming direction of the vehicle 102.

In block 404, the ECU 114 may determine a maximum acceptable speed along the route to the new location. The maximum acceptable speed may be similar to determining a minimum acceptable speed. The maximum acceptable speed may be the legal maximum speed limit on the road determined by the location data gathered via the GPS sensor 118. If the route does not have a legal maximum speed limit (e.g., autobahns, rural roads, etc.), the acceptable speed may be determined in a variety of methods. In some embodiments, the maximum acceptable speed may be determined by measuring the current speed with the speed sensor 120 and increasing the current speed by a predetermined percentage via the ECU 114. In some embodiments, the maximum acceptable speed may be determined by measuring the current speed with the speed sensor 120 and increasing the current speed by a predetermined speed value. In some embodiments, the maximum acceptable speed may be the fastest of the detected speeds of the nearby moving vehicles along the route detected via the radar 122 or a V2V communication. In some embodiments, the maximum acceptable speed may be an average of the detected speeds of the nearby moving vehicles along the route. In some embodiments, the maximum acceptable speed may be an average of a predetermined number of fastest detected speeds of the nearby moving vehicles along the route. In some embodiments, the maximum acceptable speed may be determined by using the location data from the GPS sensor 118 to determine the road type the vehicle 102 is being driven on and a look-up table stored on the memory 116 to determine the maximum driving speed correlating to the determined road type.

In block 406, the ECU 114 may present the maximum acceptable speed to the driver or the passenger. If the vehicle 102 is not autonomous, semi-autonomous, or the self-driving capabilities are disengaged, the driver or the passenger may manually increase the current speed of the vehicle 102 to the maximum acceptable speed within the bounds of traffic flow, turns, and other road conditions requiring speed changes (e.g., road work). Once arrived at the new location, the driver or the passenger may then reduce the speed to increase the solar energy collection via the methods explained in discussing FIGS. 2 and 3. If the vehicle 102 has self-driving capabilities and such capabilities are enabled, the ECU 114 may also automatically increase the current speed to the maximum acceptable speed in block 408.

In block 408, when the current speed is increased to the maximum acceptable speed, the ECU 114 may perpetually modify the maximum acceptable speed based on a new maximum acceptable speed determined when the method returns. The maximum acceptable speed may change based on the traffic flow, turns, and other road conditions requiring speed changes. Once the vehicle 102 arrives at the new location having the high solar load, the ECU 114 may automatically reduce the speed to increase the solar energy collection via the methods explained in discussing FIGS. 2 and 3. Thereafter, the method may return in block 412.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for reducing a current speed of a vehicle configured to operate on solar energy to increase solar energy collection, the system comprising:
    a photovoltaic (PV) panel configured to receive sunlight and convert the sunlight into electricity;
    an electric motor configured to convert the electricity into mechanical energy to propel the vehicle;
    a speed sensor configured to detect a vehicle speed in real-time;
    a solar loading sensor configured to detect a solar load in real-time;
    a global positioning system (GPS) sensor configured to detect location data corresponding to a location of the vehicle in real-time; and
    an electronic control unit (ECU) coupled to the solar loading sensor, the electric motor, the speed sensor, and the GPS sensor, and configured to:
        determine a predetermined threshold value based on a total solar load potential and an efficiency of the PV panel of the vehicle;
        compare the solar load to the predetermined threshold value;
        determine a minimum acceptable speed based on the comparison;
        calculate a difference between the solar energy collection at the minimum acceptable speed and the current speed of the vehicle; and
        present the difference to a driver of the vehicle on an output device to enable the driver to make an informed decision in reducing the current speed to increase the solar energy collection.

2. The system of claim 1 wherein the ECU is further configured to automatically reduce the current speed of the vehicle to the minimum acceptable speed when the solar load is greater than the predetermined threshold value.

3. The system of claim 1 wherein the minimum acceptable speed is determined by reducing the current speed of the vehicle by a predetermined percentage.

4. The system of claim 1 wherein the minimum acceptable speed is determined by reducing the current speed of the vehicle by a predetermined speed.

5. The system of claim 1 further comprising a radar configured to detect speeds of nearby moving vehicles sharing a road with the vehicle, the radar coupled to the ECU, and wherein the minimum acceptable speed is a slowest of the detected speeds of the nearby moving vehicles on the road.

6. The system of claim 1 wherein the minimum acceptable speed is determined by using the location data to determine a minimum speed limit on a road the vehicle is being driven on.

7. The system of claim 1 wherein the ECU is further configured to determine a new location accessible by the vehicle other than the location of the vehicle, the solar load being greater than the predetermined threshold value at the new location and greater than the solar load at the location of the vehicle.

8. The system of claim 7 wherein the ECU is further configured to determine a maximum acceptable speed based on sensor data and present the maximum acceptable speed to the driver to enable the driver to temporarily increase the current speed to the maximum acceptable speed until the vehicle reaches the new location.

9. The system of claim 8 wherein the ECU is further configured to automatically increase the current speed to the maximum acceptable speed until the vehicle reaches the new location.

10. A method for reducing a current speed of a vehicle configured to operate on solar energy to increase solar energy collection, the method comprising:
    receiving, by an electronic control unit (ECU), an input from a driver of the vehicle that the driver desires to reduce the current speed of the vehicle to increase the solar energy collection;

detecting a solar load via a solar loading sensor coupled to the ECU;

determining, by the ECU, a predetermined threshold value based on a total solar load potential and an efficiency of a photovoltaic (PV) panel of the vehicle;

determining that the solar load is greater than the predetermined threshold value via the ECU;

determining, by the ECU, whether a road the vehicle is being driven on has a minimum speed limit via location data obtained from a global positioning system (GPS) sensor connected to the ECU;

calculating, by the ECU, a difference between the solar energy collection of the vehicle at the current speed and at the minimum speed limit if the minimum speed limit is detected or calculating a difference between the solar energy collection of the vehicle at the current speed and at one or more optimized speeds if no minimum speed limit is detected, the one or more optimized speeds determined based on data detected by one or more sensors including the GPS sensor; and presenting, by an output device, the difference to a driver of the vehicle to enable the driver to make an informed decision in reducing the current speed to the minimum speed limit or the one or more optimized speeds.

11. The method of claim 10 further comprising automatically reducing, by the ECU, the current speed to the minimum speed limit if the minimum speed limit is detected or one of the one or more optimized speeds determined to result in the highest solar energy collection if no minimum speed limit is detected when the solar load is greater than the predetermined threshold value.

12. The method of claim 10 wherein one of the one or more optimized speeds is determined by reducing the current speed of the vehicle by a predetermined percentage.

13. The method of claim 10 wherein one of the one or more optimized speeds is determined by reducing the current speed of the vehicle by a predetermined speed.

14. The method of claim 10 further comprising detecting speeds of nearby moving vehicles sharing the road with the vehicle via a radar coupled to the ECU, and wherein one of the one or more optimized speeds is determined by a slowest of the detected speeds of the nearby moving vehicles on the road.

15. The method of claim 10 wherein a memory coupled to the ECU stores a look-up table having a different driving speed for a given road type, and one of the one or more optimized speeds is determined by using the location data to determine the road type the vehicle is being driven on and the look-up table to determine the driving speed correlating to the determined road type.

16. The method of claim 10 wherein the ECU accounts for hysteresis in determining whether the solar load is greater than the predetermined threshold value and continues operating to reduce the current speed if the solar load falls below the predetermined threshold value within a predetermined range for a predetermined time period.

17. The method of claim 10 wherein the predetermined threshold value is determined based on a total solar load potential and an efficiency of the PV panel.

18. A method for reducing a current speed of an autonomous or semi-autonomous vehicle configured to operate on solar energy to increase solar energy collection, the method comprising:

detecting a solar load via a solar loading sensor coupled to an electronic control unit (ECU);

determining a predetermined threshold value based on a total solar load potential and an efficiency of a photovoltaic (PV) panel of the vehicle;

determining that the solar load is greater than the predetermined threshold value via the ECU;

determining, by the ECU, whether a road the vehicle is being driven on has a minimum speed limit via location data gathered obtained from a global positioning system (GPS) sensor connected to the ECU;

determining, by the ECU, a minimum acceptable speed based on the determined minimum speed limit or other sensor data detected by one or more sensors including the GPS sensor if there is no minimum speed limit; and automatically reducing, by the ECU, the current speed to the minimum acceptable speed.

19. The method of claim 18 further comprising periodically checking, by the ECU, whether the minimum acceptable speed has changed based on one or more new conditions of the road and, if so, determining a new minimum acceptable speed and automatically setting the current speed to the new minimum acceptable speed.

20. The method of claim 18 further comprising determining, by the ECU, a difference between the solar energy collection of the vehicle at the current speed and at the minimum acceptable speed and informing, by an output device, the driver of the difference to enable the driver to make an informed decision in reducing the current speed to increase the solar energy collection.

* * * * *